(12) United States Patent
Huber et al.

(10) Patent No.: US 8,558,149 B2
(45) Date of Patent: Oct. 15, 2013

(54) UTENSIL FOR CONTAINING FOODSTUFFS, APPLICABLE TO COOKING IN A MICROWAVE OVEN

(75) Inventors: Lukas Werner Huber, Barcelona (ES); Jose Maria Llorente Homanpera, Tiana (ES)

(73) Assignee: Lekue, S.L., La Llagosta (Barcelona) (ES)

( * ) Notice: Subject to any disclaimer, the term of this patent is extended or adjusted under 35 U.S.C. 154(b) by 709 days.

(21) Appl. No.: 12/676,220

(22) PCT Filed: Sep. 7, 2007

(86) PCT No.: PCT/ES2007/000505
§ 371 (c)(1),
(2), (4) Date: May 19, 2010

(87) PCT Pub. No.: WO2009/030783
PCT Pub. Date: Mar. 12, 2009

(65) Prior Publication Data
US 2010/0218690 A1   Sep. 2, 2010

(51) Int. Cl.
*H05B 6/80* (2006.01)
*B65D 43/16* (2006.01)

(52) U.S. Cl.
USPC ........ 219/730; 219/732; 206/45.23; 220/4.22

(58) Field of Classification Search
USPC .......... 219/727–730, 732, 735, 686; 426/107, 426/111, 234, 243, 394, 521; 99/440; 206/5, 6, 216, 45.23, 424.6, 564; 220/4.22, 4.23, 212, 339, 375, 505
See application file for complete search history.

(56) References Cited

U.S. PATENT DOCUMENTS

| | | | |
|---|---|---|---|
| 4,908,487 A | 3/1990 | Sarnoff et al. | |
| 5,026,958 A | 6/1991 | Palacios | |
| 5,615,765 A * | 4/1997 | Roericht | 206/45.23 |
| 2003/0080119 A1 | 5/2003 | Chisholm et al. | |
| 2006/0266757 A1 | 11/2006 | Camacho et al. | |

FOREIGN PATENT DOCUMENTS

EP   1 277 672 A1   1/2003

OTHER PUBLICATIONS

Papillote en silicona con asas rigidas (with English Translation), www.cacharrosdecocina.com [retrieved from Internet: http://www.directoalpaladar.com/utensilios/papillote-en-silicona-con-asas-rigidas].
Silikomart [retrieved from Internet: http://www.silikomart.net.
International Search Report for PCT International Application No. PCT/ES2007/000505 mailed Jan. 14, 2008.

* cited by examiner

*Primary Examiner* — Quang Van
(74) *Attorney, Agent, or Firm* — RatnerPrestia

(57) ABSTRACT

A utensil for containing foodstuffs, applicable to cooking in a microwave oven, including a receptacle made of an elastomer material with an access opening and a cover for covering the access opening. The receptacle is formed by one or more walls including a bottom wall in elongated channel shape and opening edges defining the access opening at a height greater than the bottom. The bottom wall includes reinforcing ribs projecting outwardly from an outer surface thereof and providing supports leaving most of the outer surface of the bottom wall exposed to the surrounding atmosphere when the receptacle is on a support surface. The bottom wall is connected at its ends to end walls determining respective end opening edges configured to support lids.

25 Claims, 6 Drawing Sheets

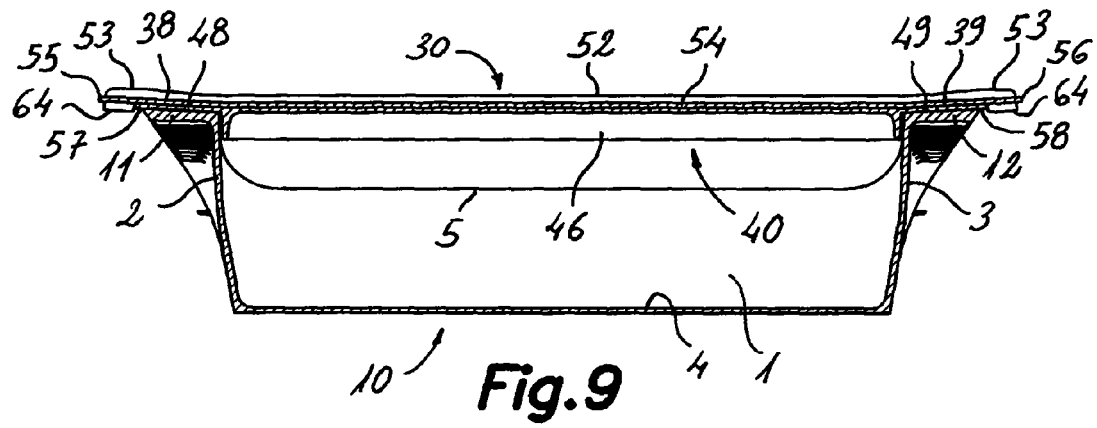
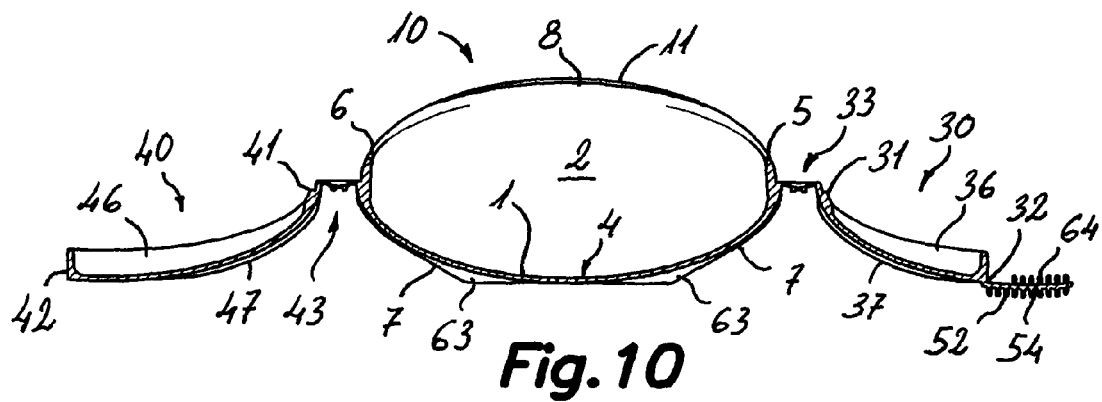
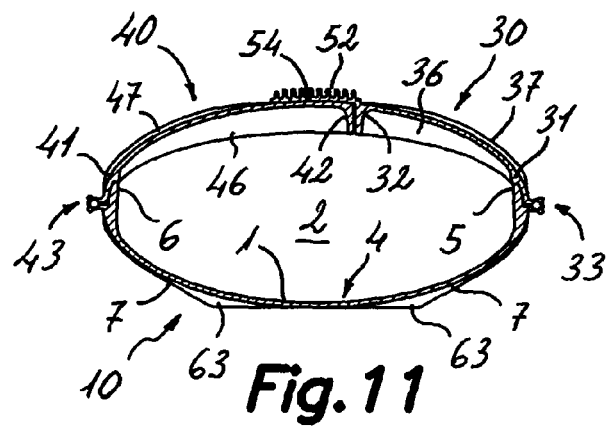

UTENSIL FOR CONTAINING FOODSTUFFS, APPLICABLE TO COOKING IN A MICROWAVE OVEN

This application is a U.S. National Phase Application of PCT International Application No. PCT/ES2007/000505, filed Sep. 7, 2007.

TECHNICAL FIELD

The present invention relates to a container for containing foodstuffs during their conservation, refrigeration, freezing or cooking, especially applicable to cooking in a microwave oven by the en papillote (in parchment paper) technique.

BACKGROUND OF THE INVENTION

The technique of cooking food en papillote consists of wrapping the foodstuffs to be cooked in a piece of paper forming therewith a wrapping closed by several creases and folds, and putting the wrapping in an oven at a temperature and for a time suitable for cooking foodstuffs, which is carried out with the cooperation of the steam released by the foodstuffs enclosed in the wrapping. Once the cooking has finished, the wrapping is removed from the oven and opened or torn to extract the foodstuffs, and the paper is disposed of. Although this technique is traditionally carried out in a conventional convection oven, cooking en papillote has become popular since microwave ovens appeared because of the greater convenience that the use of this type of oven represents. The paper used cannot be any paper, but rather a special paper substantially impermeable to liquids and steam, suitable for food applications and resistant to temperatures of up to 200° C. or more, which is sold in specialized establishments. A drawback of this special disposable paper is that it is economically costly and not always on hand in a domestic kitchen. When there is no special paper it is common to use aluminium foil in its place, although it has several drawbacks. In the first place, aluminium foil is very prone to tearing and, for example, any edge, bone or the like present in the foodstuffs to be cooked can destroy the wrapping and cause the juices or even the actual foodstuffs to spill out. In addition, aluminium foil is not suitable for microwave ovens due to its metallic nature.

There exist in the market several containers made of plastic or elastomer material provided with a separable lid which can be used to cook foodstuffs using the en papillote technique. Some of these containers are made of platinum-catalyzed silicone and can be used both in conventional convection ovens and in microwave ovens. Nevertheless, these containers of the prior art are barely or not at all adapted to the specific conditions of cooking in a convection oven or microwave oven. For example, the containers generally have a flat bottom wall in contact with the support surface which prevents the hot air or the microwaves inside the oven from coming into contact with the outer surface of the bottom wall of the container, which can lengthen the time necessary for cooking foodstuffs and/or can cause irregular cooking thereof. Furthermore, given the elastic nature of silicone, the walls of the containers of this type need to have a considerable thickness to provide enough consistency for handling the container, and given that silicone is a poor heat conducting material, the thickness of the walls also negatively affects the cooking time.

Patent application US 2005/109772 A1 describes an utensil for containing foodstuffs applicable to cooking in a microwave oven having a receptacle with an access opening and a lid connected at one edge to one side edge of the receptacle access opening. The receptacle has a bottom wall in the form of a channel providing side opening edges and said bottom wall is connected to end walls providing end opening edges, said side and end opening edges forming the access opening. The lid has a top wall in the form of a channel providing side closing edges and said top wall is connected to end walls providing end closing edges, said side and end closing edges forming a closing perimeter that meets the side and end opening edges of the access opening of the receptacle at a common plane when the lid is closed.

Respective lower and upper flanges extend outwardly from the end edges of the receptacle and from the end edges of the lid. Said lower and upper flanges are superimposed and cooperate with each other to provide end handles when the lid is in a closed position. A drawback with this construction is that the handles are horizontally flat, which makes the grip few ergonomic, and are located near the center of gravity when the inner space provided by the receptacle and the lid in the closed position is filled with foodstuffs, which makes the utensil unstable when it is supported by the end handles in a filled condition.

DISCLOSURE OF THE INVENTION

The present invention contributes to overcoming the previous and other drawbacks by providing a utensil for containing foodstuffs applicable to cooking in a microwave oven, of the type comprising a receptacle made of an elastomer material for containing foodstuffs, with an access opening and covering means for covering said access opening. The utensil of the present invention is characterized in that the receptacle is formed by one or more walls including a curved bottom wall and opening edges defining the access opening at a height greater than said bottom wall. Furthermore, a plurality of reinforcing ribs is formed projecting outwardly from at least one outer surface of said bottom wall and providing a plurality of supports leaving all or most of the outer surface of the bottom wall substantially exposed to the surrounding atmosphere when the receptacle is on a support surface.

With this construction, by virtue of the rigidizing action of the mentioned reinforcing ribs, the bottom wall and other walls of the receptacle can be significantly thinner, for example having a thickness from 0.5 mm to 0.9 mm when platinum-catalyzed silicone is used as an elastomer material, in comparison with the containers of the prior art lacking reinforcing ribs. This greater thinness of the walls of the receptacle increases the heat transmission capacity therethrough and reduces the time necessary for cooking. Furthermore, the supports provided by the reinforcing ribs allow the curved bottom wall to be separated from the support surface and therefore exposed to the hot air or to the microwaves inside the oven, which entails quicker and more uniform cooking of the foodstuffs contained in the receptacle.

In preferred embodiments, the bottom wall of the utensil of the present invention has an elongated channel shape defining side edges of the access opening and is connected at its ends to end walls defining respective end edges of the access opening. These end edges of the access opening of the receptacle are convex curved and have lower ends at the level of said side edges and central areas which are raised to a level above the side edges. The mentioned covering means can comprise a single curved lid or two curved lids having side edges adjacent to the side edges of the access opening of the receptacle and concave curved end edges resting on the end edges of the access opening of the receptacle in a closed position. Thus, the receptacle and the lid or the lids form in said closed position an elongated hollow body with a substantially elliptical cross section. Although it is not indispensable, it is preferred that the lid or the lids be likewise made of an elastomer material and form a one-piece body with the receptacle. The reinforcing ribs of the receptacle are arranged spaced from one another and parallel to the end walls. The lid or each of the lids can likewise have a plurality of reinforcing ribs spaced from one another and parallel to the end walls of the receptacle, such that the thickness of the lid or of the lids between the ribs can also be significantly thin, for example from 0.5 mm to 0.9 mm thick when platinum-catalyzed silicone is used as an elastomer material.

BRIEF DESCRIPTION OF THE DRAWINGS

The previous and other features and advantages will be more fully understood from the following detailed description of exemplary embodiments with reference to the attached drawings, in which:

FIG. 9 is a cross section view similar to FIG. 8 but with the utensil in the closed position;

FIG. 10 is a cross section view taken along the plane X-X indicated in FIG. 7; and FIG. 11 is a cross section view similar to FIG. 10 but with the utensil in the closed position.

DETAILED DESCRIPTION OF EXEMPLARY EMBODIMENTS

Figure 1:
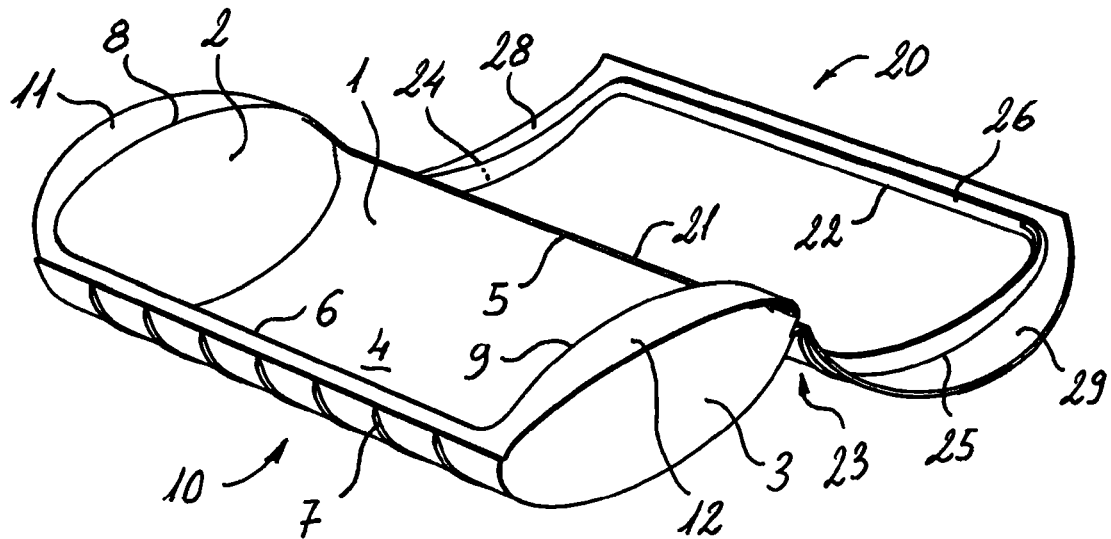
FIG. 1 is a perspective view of a utensil for containing foodstuffs applicable to cooking in a microwave oven according to a first embodiment of the present invention, in an open position.

Referring first to the figures in general, the utensil for containing foodstuffs applicable to cooking in a microwave oven of the present invention comprises a receptacle 10 made of an elastomer material configured to contain foodstuffs, which is provided with an access opening. The utensil further comprises covering means for covering said access opening. These covering means can comprise a lid 20 (FIGS. 1 and 2) or two lids 30, 40 (FIGS. 3 to 11) which can be separable or be integrally joined to the receptacle 10. The receptacle 10 is formed by several walls including a curved bottom wall 1. The walls of the receptacle provide opening edges 5, 6, 8, 9 defining the access opening at a height greater than said bottom wall 1. A plurality of reinforcing ribs 7 providing a plurality of supports projects outwardly from an outer surface of the bottom wall 1, leaving all or at least most of the outer surface of the bottom wall 1 substantially exposed to the surrounding atmosphere when the receptacle 10 is arranged on a support surface.

Figure 2:
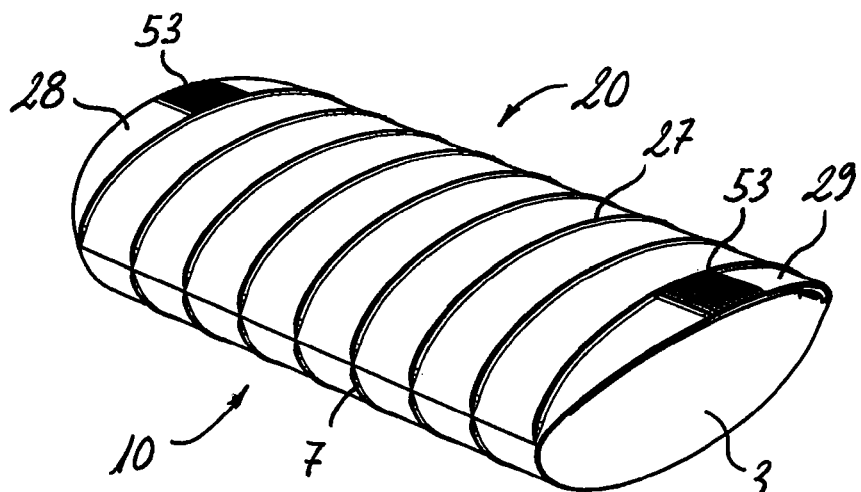
FIG. 2 is a perspective view of the utensil of FIG. 1 in a closed position.
Figure 3:
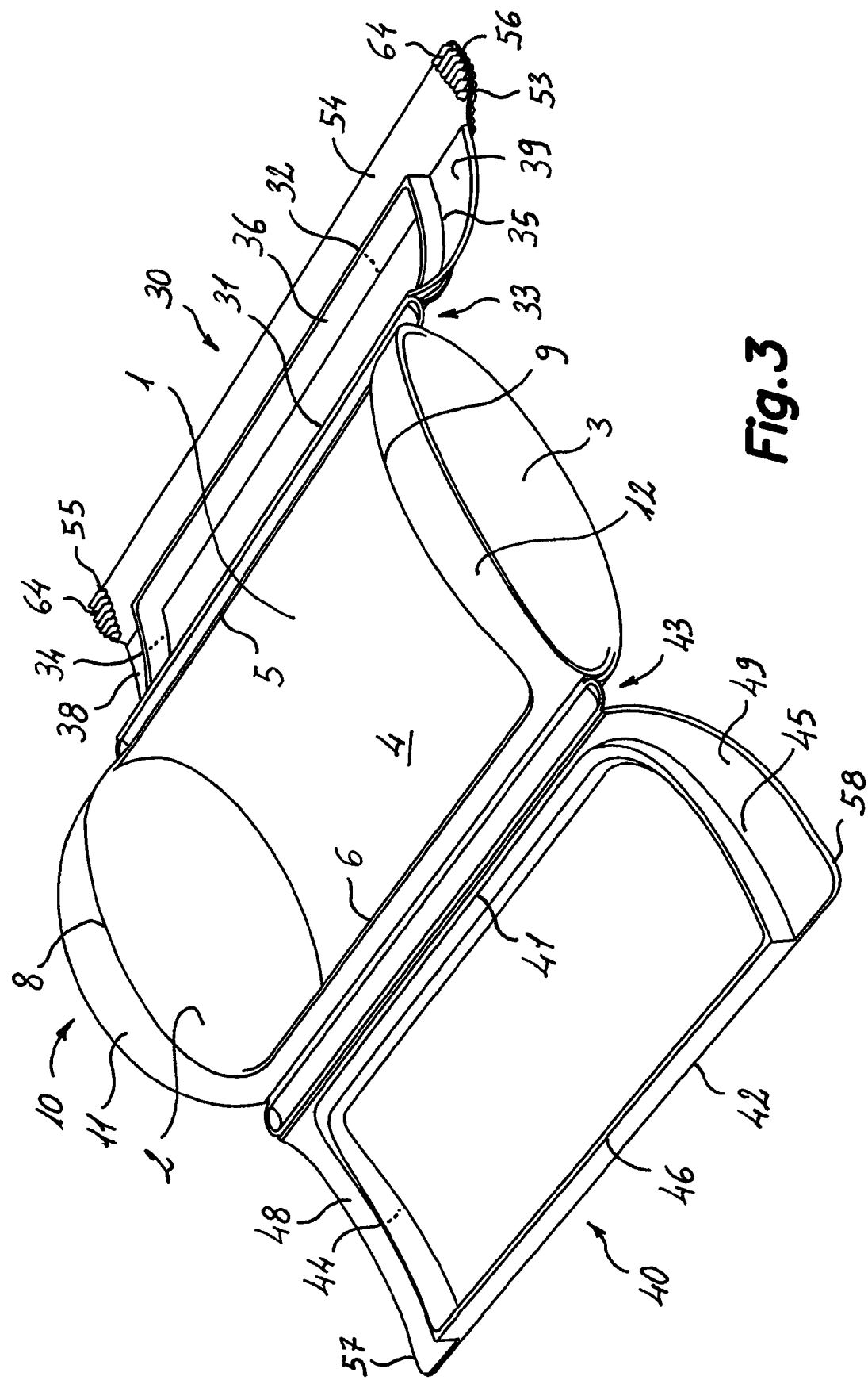
FIG. 3 is a perspective view of a utensil for containing foodstuffs applicable to cooking in a microwave oven according to a second embodiment of the present invention, in an open position.

With specific reference to FIGS. 1 and 2 a first embodiment of the utensil of the present invention is now described, in which the bottom wall 1 of the receptacle 10 has an elongated channel shape defining side opening edges 5, 6. The bottom wall 1 is connected at its ends to end walls 2, 3 defining respective end opening edges 8, 9. The mentioned side opening edges 5, 6 provided by the bottom wall 1 of the receptacle 10 are substantially rectilinear and horizontal, in other words, substantially parallel to a generatrix of the bottom wall 1, whereas each of said end opening edges 8, 9 provided by the end walls 2, 3 of the receptacle 10 is convex curved and has lower ends at the level of said side opening edges 5, 6 and a central area which is raised to a level above the side opening edges 5, 6. In fact, the end walls 2, 3 have a substantially elliptical shape arranged with its longest axis in a horizontal position, and the bottom wall 1 is connected substantially to the lower half of said elliptical shape. Optionally, the end walls 2, 3 are slightly slanting in diverging directions upwardly from the bottom wall 1. The connections between the side opening edges 5, 6 and the end opening edges 8, 9 are carried out by means of rounded transition sections. On the bottom wall 1 of the receptacle 10, the mentioned plurality of ribs 7 are arranged substantially parallel to said end walls 2, 3 and spaced from one another, such that the ribs 7 extend from a central longitudinal area 4 of the bottom wall 1 to virtually the corresponding side opening edges 5, 6. The lower part of the ribs 7 is configured to provide the mentioned supports. The ribs 7 project outwardly from an outer surface of the bottom wall 1, such that the inner surface of the bottom wall 1 is smooth and preferably has a glossy polished finish to facilitate cleaning.

In this first embodiment, the covering means comprise a curved lid 20 made of the same elastomer material as the receptacle 1, and forming a one-piece body with the receptacle 10. To that end, the lid 20 has a first side edge 21 connected to one of the side opening edges 5 of the bottom wall 1 of the receptacle 10 by a hinge region 23 and a second side edge 22 configured to be arranged on the other one of the side opening edges 6 of the bottom wall 1 of the receptacle 10 in a closed position. Furthermore, the lid 20 has concave curved end edges 24, 25 resting on the end opening edges 8, 9 of the receptacle 10 in a closed position. The end edges 24, 25 of the lid 20 preferably describe a concave curve with a radius or radii smaller than the radius or radii of the convex curve described by the end opening edges 8, 9 of the receptacle 10, for the purpose of adapting the greatest deformation that the lid 20 may experience to the configuration of the receptacle 10. Thus, in the closed position shown in FIG. 2, the receptacle 10 and the lid 20 form an elongated hollow body with a substantially elliptical cross section, in which approximately the lower half is formed by the receptacle 10 and the upper half by the lid 20.

The lid 20 has a perimetral rim 26 projecting inwardly from an inner surface of the lid 20 and extending along at least one substantial part of the outer perimeter of the lid 20. This rim 26 contributes to rigidizing the lid 20 and is configured to be accommodated between the side opening edges and end edges 5, 6, 8, 9 of the receptacle 10 in the closed position. The lid 20 also has formed thereon a plurality of reinforcing ribs 27 substantially parallel to the end walls 2, 3 of the receptacle 10 and projecting outwardly from an outer surface of the lid 20. Thus, the inner surface of the lid 20 is smooth and preferably has a glossy polished finish to facilitate cleaning. The ribs 27 could alternatively project inwardly from the inner surface of the lid 20 given that they are rarely going to come into contact with the foodstuffs contained in the receptacle 10.

The end walls 2, 3 of the receptacle 10 include respective handles 11, 12 laterally extending outwardly in cantilever from the corresponding convex curved opening edges 8, 9 forming convex curved upper surfaces common therewith. End portions 28, 29 configured to cover the mentioned handles 11, 12 in the closed position laterally extend outwardly in cantilever from the end edges 24, 25 of the lid 20. In fact, said end portions 28, 29 of the lid 20 complement the handles 11, 12 of the receptacle 10 on the upper part. The handles 11, 12 have embossments (not visible in FIGS. 1 and 2) formed on their respective lower surfaces provided to increase the heat transfer surface for the purpose of contributing to prevent the user from being burned in the gripping area, and to provide a non-slip surface for the purpose of facilitating gripping. Embossments 53 are similarly formed for the same purpose on the outer surfaces of the end portions 28, 29 of the lid 20.

In relation to FIGS. 3 to 11, a second embodiment of the utensil of the present invention is now described, which is generally similar to the first embodiment described above in relation with FIGS. 1 and 2 but with the main difference of incorporating two lids 30, 40 rather than a single lid 20.

The receptacle 10 of this second embodiment is very similar to that of the first embodiment and comprises a curved bottom wall 1 having an elongated channel shape, with a central longitudinal area 4 in the lower part and upper edges substantially parallel to a generatrix of the bottom wall 1, said upper edges forming the side opening edges 5, 6 of the access opening to the receptacle 10. The bottom wall 1 is connected at its ends to end walls 2, 3 defining respective end opening edges 8, 9 of the access opening to the receptacle 10. Each of the mentioned end opening edges 8, 9 is convex curved and has lower ends at the level of said side opening edges 5, 6 and a central area which is raised to a level above the side opening edges 5, 6. In the second embodiment shown, the end walls 2, 3 have a substantially elliptical shape arranged with its longest axis in a horizontal position, and the bottom wall 1 is substantially connected to the lower half of said elliptical shape. The connections between the side opening edges 5, 6 and the end opening edges 8, 9 are carried out by means of rounded transition sections. A plurality of ribs 7 project outwardly from an outer surface of the bottom wall 1 of the receptacle 10, and the ribs 7 are arranged substantially parallel to said end walls 2, 3 and spaced from one another.

Figure 5:
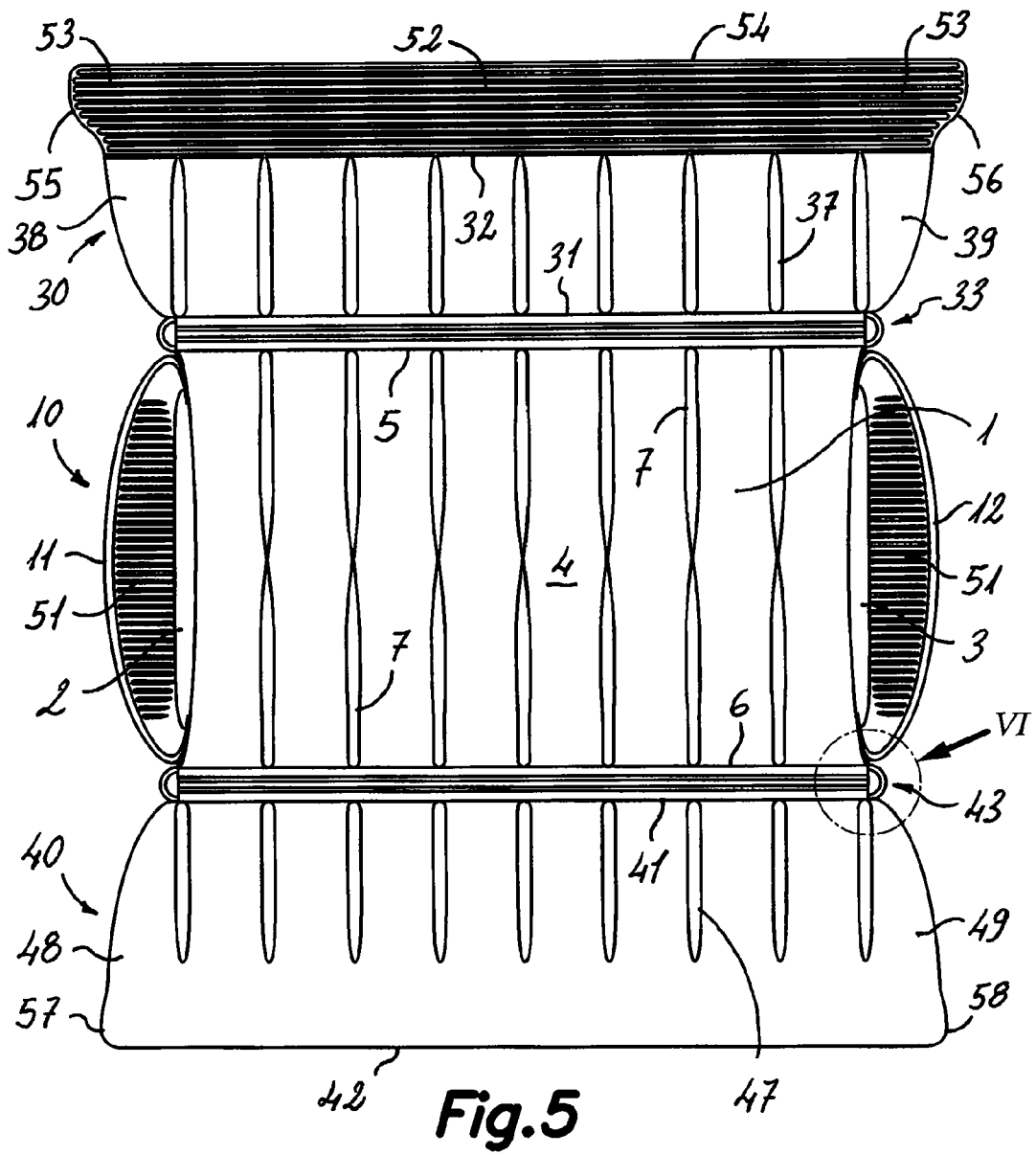
FIG. 5 is a bottom view of the utensil of FIGS. 3 and 4 in the open position.

As is better shown in FIGS. 5 and 9, the ribs 7 form two groups of ribs aligned from one side to the other of said central longitudinal area 4 of the bottom wall 1 and substantially extend from said central longitudinal area 4 to virtually the corresponding side opening edges 5, 6. The lower part of the ribs 7 is configured to provide supports 63 (FIGS. 10 and 11) capable of keeping the receptacle 10 stable on a support surface, leaving the entire outer surface of the bottom wall substantially exposed to the surrounding atmosphere except for a line in the central longitudinal area 4. It will be understood that the ribs 7 could alternatively be continuous from one side to the other of the bottom wall 1 to leave the entire outer surface of the bottom wall exposed to the surrounding atmosphere including the central longitudinal area 4. Since the ribs 7 project outwardly from the outer surface of the bottom wall 1, the inner surface of the bottom wall 1 is smooth and preferably has a glossy polished finish to facilitate cleaning.

Figure 4:
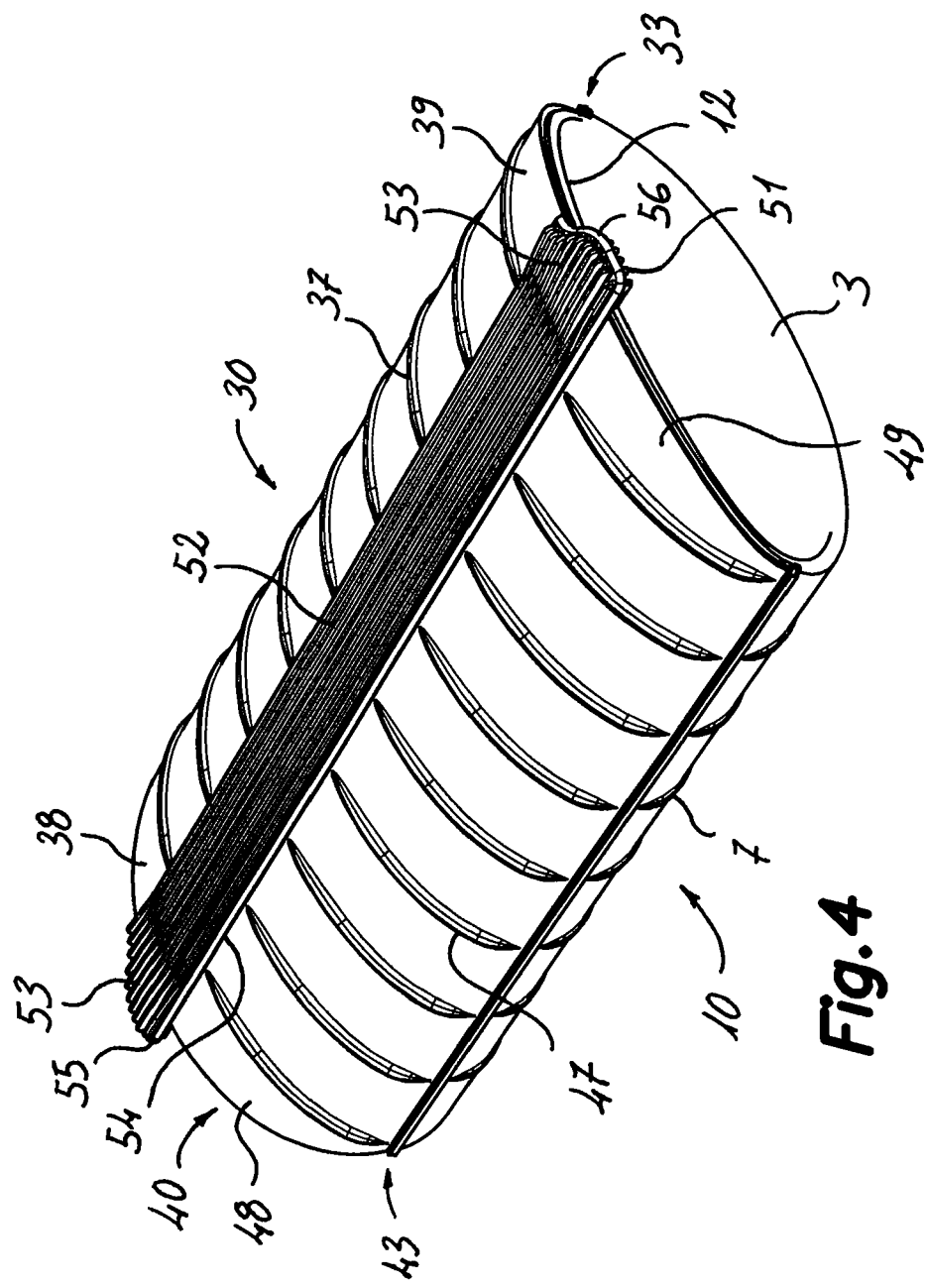
FIG. 4 is a perspective view of the utensil of FIG. 3 in a closed position.

The two previously mentioned lids 30, 40 are curved and have respective first side edges 31, 41, respective second side edges 32, 42 and respective concave curved end edges 34, 35; 44, 45. The mentioned first side edges 31, 41 of the lids 30, 40, which are made of an elastomer material and form a one-piece body with the receptacle 10, are connected to both of said side edges 5, 6 of the bottom wall 1 of the receptacle 10 by corresponding longitudinal hinge regions 33, 43, such that the lids 30, 40 can be rotated around said hinge regions 33, 43 between an open position (FIG. 3) and a closed position (FIG. 4). In the closed position, the second side edges 32, 42 of the lids 30, 40 are arranged adjacent to one another above the central longitudinal area 4 of the bottom wall 1 of the receptacle 10, and the concave curved end edges 34, 35; 44, 45 of the lids 30, 40 rest on the convex curved end opening edges 8, 9 of the receptacle 10.

Each lid 30, 40 furthermore has formed therein a perimetral rim 36, 46 projecting inwardly from an inner surface of the corresponding lid 30, 40 and extending along at least one substantial part of an outer perimeter of the corresponding lid 30, 40. These rims 36, 46 contribute to rigidizing the lids 30, 40 and are configured to be accommodated between the side and end opening edges 5, 6, 8, 9 of the receptacle 10 in the closed position. As is shown in FIG. 10, longitudinal sections of the rims 36, 46 are adjacent to one another above the central longitudinal area 4 of the bottom wall 1 in the closed position. The two lids 30, 40 furthermore have formed therein a plurality of respective spaced reinforcing ribs 37, 47 substantially parallel to the end walls 2, 3 of the receptacle 10. These ribs 37, 47 project outwardly from an outer surface of the corresponding lid 30, 40 such that the inner surface of the lids 30, 40 can be smooth and provided with a glossy polished finish to facilitate cleaning.

The end walls 2, 3 of the receptacle 10 include respective handles 11, 12 laterally extending outwardly in cantilever from the corresponding convex curved opening edges 8, 9 forming convex curved upper surfaces common therewith, and the lids 30, 40 have respective end portions 38, 39; 48, 49 adjacent to said concave curved end edges 34, 35; 44, 45 and laterally extending outwardly in cantilever, defining respective lower concave curved surfaces configured to cover and complement the mentioned handles 11, 12 in the closed position, as shown in FIG. 9. It can be seen in FIGS. 8 and 9 that the end walls 2, 3 are slightly slanting in diverging directions upwardly from the bottom wall 1 and that the handles 11, 12 are likewise slanting slightly upwardly and outwardly from the end walls 2, 3 of the receptacle 10. When the lids 30, 40 are arranged in the closed position, the end portions 38, 39; 48, 49 of the lids 30, 40 are deformed to adapt to the slant of the handles 11, 12.

One of the lids, specifically lid 30 in the second embodiment, has a longitudinal flap 54 extending from its second side edge 32 and along the entire length thereof. This flap 54 is sized to overlap a region adjacent to the second side edge 42 of the other lid, specifically of lid 40 in the second embodiment, when the lids 30, 40 are arranged in the closed position. Formed on an outer surface of the flap 54 there are embossments 52 in the form of longitudinal cords configured to increase the rigidity of the second side edge 32 of the lid 30. End flanges 55, 56 laterally extend outwardly in cantilever from the ends of the flap 54. When the lids 30, 40 are in the closed position, said end flanges 55, 56 project from the end portions 48, 49 of the other lid 40, as shown in FIG. 9, and serve to individually grip the lid 30 to lift it before the lid 40 when the utensil is to be opened. In addition, the end portions 48, 49 of the lid 40, which has its second side edge 42 overlapped in the closed position, has prominences 57, 58 laterally extending outwardly in cantilever and, in the closed position, projecting from the handles 11, 12 of the receptacle 10 below said end flanges 55, 56, as shown in FIG. 9. The mentioned prominences 57, 58 are shorter than the end flanges 55, 56, such that they do not prevent the end flanges 55, 56 from being gripped first to open lid 30 but allow being gripped individually when lid 30 is open to open lid 40.

Embossments 51, 53 configured to increase the heat transfer surface for the purpose of contributing to prevent the user from being burned and to facilitate gripping of the utensil while keeping the lids 30, 40 closed are respectively formed in respective lower surfaces of the handles 11, 12 and in corresponding upper surfaces of the end portions 38, 39 of the lid 30 having the flap 54 associated thereto. Likewise, the end flanges 55, 56 have lower surfaces with embossments 64 configured to increase the heat transfer surface and to facilitate gripping, and the mentioned embossments 53 of the end portions 38, 39 of the lid 30 extend on upper surfaces of the end flanges.

As is better shown in FIGS. 10 and 11, the receptacle 10 and the lids 30, 40 form, in the closed position, an elongated hollow body with a substantially elliptical cross section, and, according to what has been described above, the end opening edges 8, 9 of the end walls 2, 3 of the receptacle 10 are convex curved and the concave curved end edges 34, 35; 44, 45 of the lids 30, 40 are supported thereon. The curve described by these concave curved end edges 34, 35; 44, 45 of the lids 30, 40 has a radius or radii smaller than the radius or the radii of a curve described by the convex curved end opening edges 8, 9 of the receptacle 10. Thus, the end portions 38, 39; 48, 49 of the lids 30, 40 are slightly deformed to adapt to the curve of the handles 11, 12 and thereby provide a tighter closure, which is advantageous taking into account that the lids are tightened by the actual weight thereof and other specific closing means are not provided.

Figure 6:
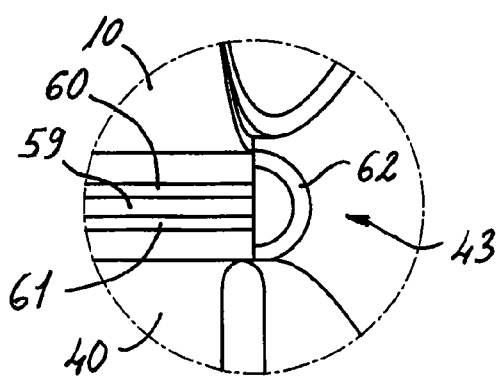
FIG. 6 is an enlarged view of detail VI of FIG. 5.
Figure 6A:
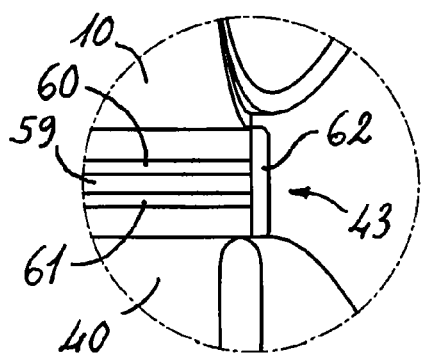
FIG. 6A is a view similar to FIG. 6 but relating to another alternative exemplary embodiment for the hinge region.
Figure 7:
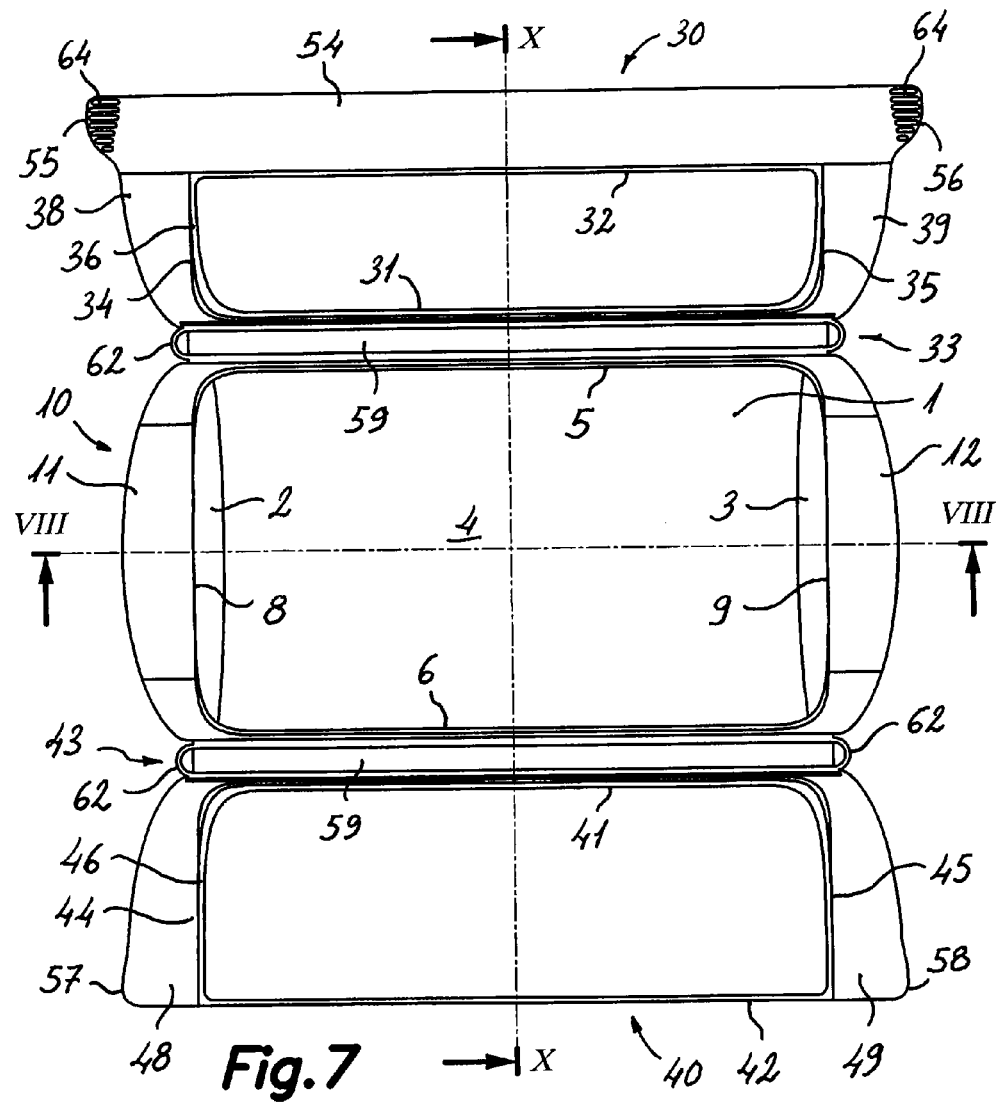
FIG. 7 is a top view of the utensil of FIGS. 3 and 4 in the open position.
Figure 8:
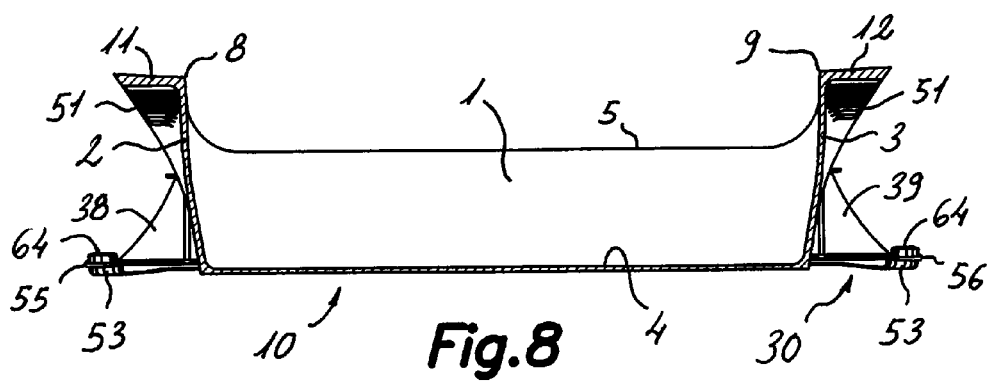
FIG. 8 is a cross section view taken along the plane VIII-VIII indicated in FIG. 7.

Both in the first and in the second embodiment of the present invention, the mentioned hinge region 23, or each of said hinge regions 33, 43, comprises a thin band 59 flanked by two ridges 60, 61 adjacent to the corresponding side opening edge 5, 6 of the receptacle 10 and to the side edge 21, 31, 41 of the lid 20, 30, 40, respectively. FIG. 6 shows an enlarged detail of the end of one of the hinge regions 43. At each end of each hinge region 23 or of each of the hinge regions 33, 43 an anti-tear cord 62 is formed connecting the receptacle 10 with the lid 20, 30, 40 by means of a loop, preferably in the form of an arc, projecting in cantilever. This anti-tear cord 62 is separated from the end of the thin band 59 of the hinge region 23, 33, 43 by virtue of the mentioned loop projecting in cantilever and therefore does not prevent or hinder the bending of the thin flat strip 59, but the anti-tear cord 62, which has a thickness greater than that of the thin band 59, prevents the thin band 59 from being able to be broken by tearing. FIG. 6A shows an alternative embodiment for the hinge region, in which the anti-tear cord 62 does not define a portion in the form of an arc or loop projecting in cantilever, but rather extends parallel to the end edge of the thin band 59. Here, the ends of the thin band 59 and the ridges 60, 61 are connected to the anti-tear cord 62, although alternatively, the thin band 59 and/or the ridges 60, 61 might not be connected to the anti-tear cord 5.

The elastomer material from which the utensil according to any of the first and second embodiments of the present invention is made is preferably a platinum-catalyzed silicone, suitable for culinary uses, and resistant to both high and low temperatures, whereby the utensil is suitable for containing foodstuffs during their conservation, refrigeration, freezing or cooking, and is especially applicable to the cooking of foodstuffs in a microwave oven, for example by the en papillote technique. Furthermore, as a result of the reinforcing ribs 7, 27, 37, 47 described above, the thickness of the walls of the receptacles 10 and of lid 20 or of the lids 30, 40 between the ribs 7, 27, 37, 47 can be as thin as 0.5 mm to 0.9 mm, which favors the transmission of heat or microwaves through the bottom wall 1 and the lid 20 or lids 30, 40 while cooking.

It will be understood that although the lids 20, 30, 40 have been shown and described in the first and second embodiments as being connected to the receptacle 10 by respective hinge regions 23, 33, 43, lids 30, 40 could alternatively be separable from the receptacle 10, such that, in the closed position, the first side edges 31, 41 of the lids 30, 40 are simply adjacent to the corresponding side edges 5, 6 of the receptacle 10, or the ribs 37, 47 could project inwardly from an inner surface of the lids 30, 40 or from both inner and outer surfaces of the lids 30, 40.

A person skilled in the art will be capable of making modifications and variations based on the embodiments shown and described without departing from the scope of the present invention as it is defined in the attached claims.

The invention claimed is:

1. A utensil for containing foodstuffs, applicable to cooking in a microwave oven, comprising a receptacle made of an elastomeric material for containing foodstuffs, with an access opening and covering means for covering said access opening, wherein the receptacle is formed by a bottom wall in the shape of a channel defining side opening edges which is connected at its ends to end walls defining respective end opening edges, said side and end opening edges defining said access opening at a higher level than said bottom wall, wherein:

said end opening edges of said end walls have a convex shape with lower ends at the level of said side opening edges of the bottom wall and central portions which are raised to a level above the side opening edges;

said covering means comprises at least one lid having at least one first side edge adjacent to at least one of the side opening edges of the receptacle and concave end edges resting on the convex end opening edges of the receptacle in a closed position; and the end walls of the receptacle include respective handles laterally extending outwardly in cantilever from the corresponding convex end opening edges forming upper surfaces common therewith, and each lid has respective end portions adjacent to said concave end edges and configured to cover and complement said handles in the closed position.

2. The utensil according to claim 1, further comprising two of said lids, which are made of an elastomeric material forming a one-piece body with the receptacle, the lids having respective first side edges connected to one and the other of said side edges of the bottom wall of the receptacle by corresponding hinge regions, and respective second side edges adjacent to one another above a central longitudinal area of the bottom wall of the receptacle.

3. The utensil according to claim 2, wherein one of the lids has a flap extending from its second side edge to overlap a region of the other lid adjacent to its second side edge in said closed position.

4. The utensil according to claim 3, wherein said flap formed on one of the lids has end flanges laterally extending outwardly in cantilever and projecting from the end portions of the other lid in the closed position.

5. The utensil according to claim 4, wherein prominences projecting from the handles of the receptacle below said end flanges are laterally extending outwardly in cantilever from the end portions of the lid having its second side edge overlapped, said prominences being shorter than the end flanges.

6. The utensil according to claim 3, wherein said flap has an outer surface with embossments in the form of longitudinal cords configured to increase rigidity.

7. The utensil according to claim 5, wherein said end flanges have respective lower surfaces with embossments configured to increase the heat transfer surface and to facilitate gripping.

8. The utensil according to claim 1, further comprising a single lid, which is made of an elastomeric material and forms a one-piece body with the receptacle, said lid having a first side edge connected to one of said side opening edges of the bottom wall of the receptacle by a hinge region, and a second side edge configured to be arranged on the other one of the side opening edges of the bottom wall of the receptacle in a closed position.

9. The utensil according to claim 1, wherein each lid has a perimetral rim projecting inwardly from an inner surface of the lid and extending along at least one substantial part of the outer perimeter of the lid.

10. The utensil according to claim 1, wherein said handles have respective lower surfaces with embossments configured to increase the heat transfer surface and to facilitate gripping.

11. The utensil according to claim 1, wherein the receptacle has formed thereon a plurality of reinforcing ribs spaced from one another and substantially parallel to said end walls, said reinforcing ribs projecting outwardly from at least one outer surface of said bottom wall and providing a plurality of supports leaving all or most of the outer surface of the bottom wall substantially exposed to the surrounding atmosphere when the receptacle is on a support surface.

12. The utensil according to claim 1, wherein each lid have formed thereon a plurality of respective spaced reinforcing ribs substantially parallel to the end walls of the receptacle and projecting outwardly and/or inwardly from an outer and/or inner surface of the corresponding lid.

13. The utensil according to claim 2, wherein each hinge region comprises a thin band flanked by two ridges adjacent to the corresponding side opening edge of the receptacle and side edge of the lid, respectively.

14. The utensil according to claim 13, wherein at each end of each hinge region an anti-tear cord is formed connected at its ends to the receptacle and to the lid, said anti-tear cord having a thickness greater than the thickness of the thin band.

15. The utensil according to claim 1, wherein said elastomeric material is a platinum-catalyzed silicone, and the thickness of the walls of the receptacles and lid or lids between the reinforcing ribs is from 0.5 mm to 0.9 mm.

16. The utensil according to claim 2, wherein each lid has a perimetral rim projecting inwardly from an inner surface of the lid and extending along at least one substantial part of the outer perimeter of the lid.

17. The utensil according to claim 8, wherein each lid has a perimetral rim projecting inwardly from an inner surface of the lid and extending along at least one substantial part of the outer perimeter of the lid.

18. The utensil according to claim 2, wherein said handles have respective lower surfaces with embossments configured to increase the heat transfer surface and to facilitate gripping.

19. The utensil according to claim 8, wherein said handles have respective lower surfaces with embossments configured to increase the heat transfer surface and to facilitate gripping.

20. The utensil according to claim 2, wherein the receptacle has formed thereon a plurality of reinforcing ribs spaced from one another and substantially parallel to said end walls, said reinforcing ribs projecting outwardly from at least one outer surface of said bottom wall and providing a plurality of supports leaving all or most of the outer surface of the bottom wall substantially exposed to the surrounding atmosphere when the receptacle is on a support surface.

21. The utensil according to claim 8, wherein the receptacle has formed thereon a plurality of reinforcing ribs spaced from one another and substantially parallel to said end walls, said reinforcing ribs projecting outwardly from at least one outer surface of said bottom wall and providing a plurality of supports leaving all or most of the outer surface of the bottom wall substantially exposed to the surrounding atmosphere when the receptacle is on a support surface.

22. The utensil according to claim 2, wherein each lid has formed thereon a plurality of respective spaced reinforcing ribs substantially parallel to the end walls of the receptacle and projecting outwardly and/or inwardly from an outer and/or inner surface of the corresponding lid.

23. The utensil according to claim 8, wherein each lid has formed thereon a plurality of respective spaced reinforcing ribs substantially parallel to the end walls of the receptacle and projecting outwardly and/or inwardly from an outer and/or inner surface of the corresponding lid.

24. The utensil according to claim 8, wherein each hinge region comprises a thin band flanked by two ridges adjacent to the corresponding side opening edge of the receptacle and side edge of the lid, respectively.

25. A utensil for containing foodstuffs, applicable to cooking in a microwave oven, comprising a receptacle made of an elastomeric material for containing foodstuffs, with an access opening and covering means for covering said access opening, wherein the receptacle is formed by one or more walls including a bottom wall, said one or more walls defining side opening edges and end opening edges delimiting said access opening;
  said end opening edges have a convex shape with lower ends at the level of said side opening edges and central portions which are raised to a level above the side opening edges;
  said covering means comprises at least one lid having at least one first side edge adjacent to at least one of the side opening edges of the receptacle and concave end edges resting on the convex end opening edges of the receptacle in a closed position; and
  respective handles extend laterally outwardly in cantilever from the corresponding convex end opening edges forming upper surfaces common therewith, and each lid has respective end portions adjacent to said concave end edges and configured to cover and complement said handles in the closed position.

* * * * *

UNITED STATES PATENT AND TRADEMARK OFFICE
CERTIFICATE OF CORRECTION

PATENT NO.       : 8,558,149 B2                                              Page 1 of 1
APPLICATION NO.  : 12/676220
DATED            : October 15, 2013
INVENTOR(S)      : Huber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Fifteenth Day of September, 2015

Michelle K. Lee
*Director of the United States Patent and Trademark Office*